Patented Oct. 4, 1932

1,880,286

UNITED STATES PATENT OFFICE

MILTON O. SCHUR, OF BERLIN, NEW HAMPSHIRE, ASSIGNOR TO BROWN COMPANY, OF BERLIN, NEW HAMPSHIRE, A CORPORATION OF MAINE

METHOD OF TREATING PAPER ARTICLES WITH VISCOSE

No Drawing.    Application filed November 7, 1930. Serial No. 494,207.

This invention relates to the manufacture of articles containing regenerated cellulose. It further relates to viscose solutions which may advantageously be employed in the manufacture of such articles, as well as to the method of making such solutions.

When it is desired to associate regenerated cellulose into the pores of porous articles such as waterleaf papers, fabrics, and moulded or pressed pulp articles, it is preferable to use a viscose solution as the source of the regenerated cellulose, both because of its comparatively low cost and the relative ease with which the cellulose can be regenerated by the use of suitable cellulose-regenerating agents. In producing an article containing regenerated cellulose, the practice has been to treat the article with two solutions, namely, with the viscose solution, and with a solution of a cellulose-regenerating agent, preferably with drying of the article between the successive solution treatments.

In accordance with the present invention, I produce an ungelled viscose solution capable of yielding regenerated cellulose upon drying alone. Accordingly, in producing an article associated with regenerated cellulose, it is necessary to treat the article with only the solution of viscose, and then to effect a drying of the article. I have found that such a viscose solution may be obtained from the usual viscose or cellulose xanthate solution, if the free alkali originally employed to dissolve the cellulose xanthate is reduced sufficiently in concentration. For example, I have found that when the usual cellulose xanthate solution containing free alkali in the form of caustic soda is largely or completely neutralized or even treated with an excess of neutralizing agent, the xanthate may be rendered unstable, while preserving the solution in an ungelled state, so that when water is removed from the solution by drying and/or by heat, the xanthate decomposes, liberating the so-called regenerated cellulose. As the alkali is reduced in concentration, the viscose solution undergoes a partial splitting or decomposition into sulphur compounds, which in accordance with the present invention are preferably removed by aerating the solution. Such aeration not only reduces the amount of sulphur present in the viscose solution, but lessens the likelihood of contaminating the viscose-treated and dried product with ill-smelling compounds.

As a specific example of procedure, the following will suffice. To a caustic soda solution of cellulose xanthate containing, say, $3/4\%$ cellulose, may be added a neutralizing agent, preferably boric acid, until part or all of the free alkali has been neutralized, or until there is an excess of boric acid. The odor of hydrogen sulphide becomes evident as neutralization is being effected. The treated solution is preferably aerated, as by bubbling air under pressure thereinto, until the odor has substantially disappeared. The resulting solution is stable in the cold, but is easily gelled when warmed, so that it is preferably kept at or below room temperature prior to being used. It is necessary to preserve the solution in ungelled condition, for it is only as such that it may be readily absorbed by porous articles to produce products which are completely impregnated with regenerated cellulose after drying.

While the treated viscose solution may be used for the impregnation of various porous articles, including fabrics and moulded or pressed pulp articles, it is especially advantageous for use in the impregnation of a waterleaf paper intended for use as towelling, for the presence of only about 1% regenerated cellulose, based on the weight of dry fiber, in such towelling, not only materially increases the dry strength of the towelling, but may serve to quadruple or even more greatly to increase its wet strength. For some reason, of which I am not now aware, a wet strength from about 20% to 50% higher has been realized in paper towelling impregnated with boric-acid-treated viscose solution than in similar towelling which has been treated with two solutions, namely, with an untreated viscose solution and with a solution of cellulose-regenerating agent to produce the same amount of regenerated cellulose in the towelling.

One way of adding the viscose solution to the waterleaf paper is to pass the web coming from the dry end of the paper machine through a bath of viscose solution treated in accordance with the present invention, and then to pass the viscose-impregnated web over an auxiliary bank of driers, which dry the web and regenerate the cellulose therein. Such practice, while simple, involves double-drying. In the case of a paper machine equipped with a size tub and a secondary bank of driers, the impregnation of the dry web with viscose solution, and the redrying of the viscose-impregnated web present no difficulties. I prefer, however, to associate the viscose with the web before it reaches the initial drier operated in combination with the paper machine, thereby permitting saving in steam and in cost of equipment, where additional equipment is necessary, or making available the size tub for washing out from the towelling web soluble substances added thereto along with the viscose solution, and further making available the auxiliary bank of driers for drying out the washed web. In this connection, it is to be observed that the towelling is preferably freed from the soluble substances carried thereinto by the viscose solution, as these substances may be malodorous, may cause stickiness in the towelling, and may result in a colored extract when the towelling is squeezed in use. There are various ways open to the addition of the viscose solution either to the stock from which the paper is made or to the wet web proceeding to the drier of the paper machine. Thus, the solution may be added to the papermaking stock in the beater engine, to the flow box of the paper machine, or to the white water draining from the paper machine and reused in the beater engine and in the flow box. In these cases, however, it is essential to have a substantially closed, white water system, since otherwise, as is obvious to one skilled in the art, a very serious loss of viscose may be experienced. Inasmuch as a closed, white water system would necessitate the installation of large-capacity settling basins, to ensure the settling out of a sufficient quantity of water to be used for the paper machine showers, or alternately the installation of filters, I prefer to associate the viscose with the wet web formed from the papermaking stock. The viscose solution may be added to the wet web at different points of its traverse on the wet end of the paper machine. For instance, when the paper is being made on the usual Fourdrinier papermaking machine, the viscose solution may be distributed on the wet web, as by spraying or dripping the solution on the web, preferably above a suction box. In this case, it is necessary, for purposes of economy, to reuse the water coming through the suction box and squeezed out at the first press roll, in order to avoid the loss of a considerable amount of viscose which would be present in such water. While the amount of water which must be recovered and handled in such case is much less than that in the methods hereinbefore outlined, nevertheless there is a considerable reduction in the amount of water carried by the wet web immediately before and after the first press roll,—such a reduction, in fact, that the amount of water squeezed out from the wet web by the press roll may be much greater than that which can be conveniently consumed in the preparation of the viscose solution. The preferred way of associating the viscose solution with the wet web is between two press rolls, as in such case the volume of water containing viscose squeezed from the web is comparatively small and can be readily practically entirely consumed in the preparation of a viscose solution of the concentration desired for application to the wet web.

I have observed that as the viscose-impregnated web comes off the drier of the paper machine, it may be but very little higher in wet strength than similar paper lacking the presence of viscose therein. If, however, the viscose-impregnated paper is subjected to a temperature of, say, 212° F. for a few minutes, say five minutes or longer, the ultimate wet strength of such paper is realized. By "ultimate wet strength," I mean the wet strength which is developed in the viscose-impregnated paper when it is stored for one or two days after it has come off the paper machine. My theory is that at the high speed of paper machine operation, the temperature which the viscose-impregnated paper attains is not very high for an appreciable length of time, and consequently the regeneration of cellulose in the paper is incomplete when the paper issues from the drier of the paper machine. The regeneration of cellulose in the paper evidently continues at room temperature, and reaches completion at this temperature in one or two days. If desired, the dry end of the paper machine may be lengthened, that is, provided with a larger number of drier drums, so that the viscose-impregnated paper acquires a temperature conducive to the maximum wet strength therein as it comes off the machine. Or, if desired, the paper machine may be run at such a rate of capacity permitting the attainment of the maximum wet strength in the paper as fast as it is taken off from the machine.

The specific example of treating viscose solutions hereinbefore given, involving the use of boric acid as the neutralizing agent for the free alkali of the solution, is preferable, for the reason that up to date a boric-acid-treated viscose has been found to impart maximum wet strengths to papers treated therewith. The finding that boric acid produces best results is entirely empirical, for the free alkali in the viscose solution may be neutralized with other agents, such as alum, ammonium salts, carbon dioxide, sodium bicarbonate, acetic acid, sulphurous acid, and the like, or with combinations of such agents. For example, to a xanthate solution containing, say, about 1% cellulose, may be added an ammonium salt to neutralize the free alkali through the liberation of ammonia. The solution thus treated may be aerated to remove ammonia and volatile sulphides. It might be reasoned that neutralizing agents, such as ammonium chloride, might be preferable to boric acid, because of their inactivity upon regenerated cellulose, but such is not the case. Inasmuch as the regeneration of cellulose from xanthate occurs in a complex colloidal system, it might well be that the borate ion has a specific effect on the course of the regeneration of the cellulose. The use of alum as the neutralizing agent also has its advantages, not only in that it neutralizes the alkali content of a viscose solution without causing its gelling, but further in that it is comparatively inexpensive and is a common ingredient used in a paper mill. Very good results have also been obtained by using a mixture of alum and boric acid as the neutralizing agent, in which case alum, being less expensive than boric acid, lowers the cost of treating the viscose solution.

It is my theory that the cellulose xanthate undergoes decomposition or break-down during drying and/or heating to regenerate cellulose, and that this break-down is promoted by the presence of the alkali salts resulting from the neutralization of the free alkali content of the viscose solution. During drying of the viscose-solution-impregnated web, the solution undergoes a pronounced increase in concentration of alkali salts, which doubtless have a cellulose-regenerating effect on the xanthate, especially at high concentrations. These salts perhaps further tend to precipitate the cellulose xanthate from solution during the drying operation, and in so doing influence the rate of the colloidal interactions accompanied by the regeneration of cellulose. This influence may be reflected in papers of various strengths, but, in any event, it is believed to be beneficial to the resulting product.

What I claim is:

1. A process which comprises treating an article with a viscose solution capable of yielding regenerated cellulose upon drying alone, and drying the treated article to associate regenerated cellulose therewith.

2. A process which comprises impregnating a porous article with a viscose solution whose free alkali content has been largely neutralized, and drying the impregnated article to form regenerated cellulose in its pores.

3. A process which comprises treating a cellulose fiber article with a viscose solution containing substantially no alkali in free condition and drying the treated article to associate regenerated cellulose therewith.

4. A process which comprises impregnating a waterleaf paper with a viscose solution largely freed from alkali and drying the impregnated paper to form regenerated cellulose therein.

5. In the manufacture of paper containing regenerated cellulose on a papermaking machine equipped with wet and dry ends, that step which comprises associating a viscose solution capable of yielding regenerated cellulose upon mere drying with the web of paper before it reaches the dry end of the machine.

6. In the manufacture of paper containing regenerated cellulose on a papermaking machine equipped with wet and dry ends and with press rolls at its wet end, that step which comprises applying a viscose solution capable of yielding regenerated cellulose upon merely drying to the web of paper between two press rolls.

7. In the manufacture of paper containing regenerated cellulose, those steps which comprise applying to paper a solution of viscose whose free alkali content has been largely neutralized, drying the paper to associate regenerated cellulose therewith, washing out from the paper alkali salts carried thereinto by the viscose solution, and redrying the paper.

8. In the manufacture of articles containing regenerated cellulose, those steps which comprise treating the article with an aerated solution of viscose whose free alkali content has been largely neutralized, and drying the article to associate regenerated cellulose therewith.

In testimony whereof I have affixed my signature.

MILTON O. SCHUR.